US012009133B2

(12) United States Patent
Vafakhah et al.

(10) Patent No.: US 12,009,133 B2
(45) Date of Patent: Jun. 11, 2024

(54) TEMPERATURE REGULATION OF AN INDUCTOR ASSEMBLY

(71) Applicant: Ford Global Technologies, LLC, Dearborn, MI (US)

(72) Inventors: Behzad Vafakhah, Ann Arbor, MI (US); Brian Richard Light, Flat Rock, MI (US); Brandon Dobbins, Grosse Pointe Shores, MI (US); Shailesh Shrikant Kozarekar, Novi, MI (US); Sudhir Kumar, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 17/525,527

(22) Filed: Nov. 12, 2021

(65) Prior Publication Data

US 2022/0068541 A1    Mar. 3, 2022

Related U.S. Application Data

(60) Division of application No. 15/367,800, filed on Dec. 2, 2016, now Pat. No. 11,195,649, which is a
(Continued)

(51) Int. Cl.
*H01F 27/12* (2006.01)
*B60K 6/22* (2007.10)
(Continued)

(52) U.S. Cl.
CPC .............. *H01F 27/12* (2013.01); *B60K 6/22* (2013.01); *B60K 6/365* (2013.01); *B60K 6/383* (2013.01);
(Continued)

(58) Field of Classification Search
CPC .... H01F 27/12; H01F 27/2876; H01F 27/325; H01F 27/08; H01F 27/10; H01F 27/02;
(Continued)

(56) References Cited

U.S. PATENT DOCUMENTS 1,360,752 A    11/1920 Johannesen
1,579,049 A    3/1926 Ainsworth
(Continued)

FOREIGN PATENT DOCUMENTS

CA    1210464 A    8/1986
CA    2781203 A1    5/2011
(Continued)

OTHER PUBLICATIONS

Salem et al., Power Module Cooling for Future Electric Vehicle Applications: A Coolant Comparison of Oil and PGW, US Naval Academy, Annapolis, MD (2006) pp. 1-4.
(Continued)

*Primary Examiner* — Tszfung J Chan
(74) *Attorney, Agent, or Firm* — David B. Kelley; Brooks Kushman P.C.

(57) ABSTRACT

A vehicle is provided with a transmission having an inductor assembly. The inductor assembly is mounted within the transmission such that it is directly cooled by transmission fluid through at least one of spraying, splashing and immersion. The transmission includes at least one gear that is configured to, when rotating, transmit torque between an input and output of the transmission and splash fluid onto the inductor assembly to cool the inductor assembly.

20 Claims, 10 Drawing Sheets

Related U.S. Application Data continuation of application No. 13/673,731, filed on Nov. 9, 2012, now Pat. No. 9,543,069.

(51) Int. Cl.

| | | |
|---|---|---|
| *B60K 6/365* | (2007.10) | |
| *B60K 6/383* | (2007.10) | |
| *B60K 6/405* | (2007.10) | |
| *B60K 6/44* | (2007.10) | |
| *B60K 17/08* | (2006.01) | |
| *F16H 57/02* | (2012.01) | |
| *F16H 57/04* | (2010.01) | |
| *H01F 27/28* | (2006.01) | |
| *H01F 27/32* | (2006.01) | |
| *B60K 6/38* | (2007.10) | |

(52) U.S. Cl.
CPC ............ *B60K 6/405* (2013.01); *B60K 6/44* (2013.01); *B60K 17/08* (2013.01); *F16H 57/02* (2013.01); *F16H 57/0417* (2013.01); *F16H 57/0476* (2013.01); *H01F 27/2876* (2013.01); *H01F 27/325* (2013.01); *B60K 2006/381* (2013.01); *B60Y 2200/92* (2013.01); *B60Y 2306/05* (2013.01); *B60Y 2400/73* (2013.01); *F16H 2057/02034* (2013.01); *Y10S 903/902* (2013.01); *Y10S 903/91* (2013.01)

(58) Field of Classification Search
CPC .......... B60K 6/22; B60K 6/365; B60K 6/383; B60K 6/405; B60K 6/44; B60K 17/08; B60K 2006/381; F16H 57/02; F16H 57/0417; F16H 57/0476
USPC ........ 336/55, 57, 58, 59–61, 90, 92, 98, 196
See application file for complete search history.

(56) References Cited

U.S. PATENT DOCUMENTS

| | | |
|---|---|---|
| 2,608,610 A | 8/1952 | Thulin |
| 3,162,829 A | 12/1964 | Wildy |
| 3,184,564 A | 5/1965 | Ryckman |
| 3,195,086 A | 7/1965 | Taylor |
| 3,197,167 A | 7/1965 | Sturgis |
| 3,227,980 A | 1/1966 | Roser |
| 3,261,905 A | 7/1966 | Allen |
| 3,317,849 A | 5/1967 | Smith-vaniz |
| 4,123,677 A | 10/1978 | Laskaris et al. |
| 4,150,278 A | 4/1979 | Resener |
| 4,282,567 A | 8/1981 | Voigt |
| 4,485,367 A | 11/1984 | Hashizume |
| 4,549,158 A | 10/1985 | Mitsui et al. |
| 4,577,175 A | 3/1986 | Burgher et al. |
| 4,581,477 A | 4/1986 | Harumoto et al. |
| 5,352,853 A | 10/1994 | Takagi |
| 5,662,007 A | 9/1997 | Starker et al. |
| 6,384,703 B1 | 5/2002 | Ramos et al. |
| 6,392,519 B1 | 5/2002 | Ronning |
| 6,688,383 B1 | 2/2004 | Sommer et al. |
| 6,772,603 B2 | 8/2004 | Hsu et al. |
| 6,927,667 B1 | 8/2005 | Busletta et al. |
| 7,009,317 B2 | 3/2006 | Cronin et al. |
| 7,205,875 B2 | 4/2007 | Oughton, Jr. et al. |
| 7,212,406 B2 | 5/2007 | Kaishian et al. |
| 7,481,072 B2 | 1/2009 | Ostrom et al. |
| 7,508,289 B1 | 3/2009 | Wernicki |
| 7,561,429 B2 | 7/2009 | Yahata et al. |
| 7,760,060 B2 | 7/2010 | Kiuchi et al. |
| 7,800,260 B2 * | 9/2010 | Komatsu ............... H02K 5/203 180/65.1 |
| 7,823,669 B2 | 11/2010 | Bandai et al. |
| 8,009,004 B2 | 8/2011 | Ahangar et al. |
| 8,201,650 B2 | 6/2012 | Yoshida |
| 8,215,003 B2 | 7/2012 | Saka et al. |
| 9,006,255 B2 | 4/2015 | Klein |
| 2003/0098769 A1 | 5/2003 | Cheung et al. |
| 2004/0032312 A1 | 2/2004 | Yu et al. |
| 2004/0045749 A1 | 3/2004 | Jaura et al. |
| 2004/0184292 A1 | 9/2004 | Knox |
| 2006/0103256 A1 | 5/2006 | Welke |
| 2007/0075812 A1 | 4/2007 | Su et al. |
| 2009/0108971 A1 | 4/2009 | Okamoto |
| 2010/0072865 A1 * | 3/2010 | Endo ..................... B60W 20/00 903/906 |
| 2010/0175933 A1 | 7/2010 | Yoshida |
| 2010/0245016 A1 | 9/2010 | Kameda et al. |
| 2011/0068506 A1 | 3/2011 | Kusawake et al. |
| 2011/0096496 A1 | 4/2011 | Doo et al. |
| 2011/0121935 A1 | 5/2011 | Chu et al. |
| 2011/0140820 A1 | 6/2011 | Guentert et al. |
| 2011/0156853 A1 | 6/2011 | Kato et al. |
| 2011/0241815 A1 | 10/2011 | Lu |
| 2011/0267161 A1 | 11/2011 | MacLennan et al. |
| 2012/0044647 A1 | 2/2012 | Lee et al. |
| 2012/0139684 A1 | 6/2012 | Kobayashi et al. |
| 2012/0194311 A1 | 8/2012 | Suzuki |
| 2012/0200382 A1 | 8/2012 | Hejny |
| 2013/0106556 A1 | 5/2013 | Suzuki et al. |
| 2013/0141201 A1 | 6/2013 | Chou |
| 2014/0132378 A1 | 5/2014 | Vafakhah et al. |
| 2015/0162119 A1 | 6/2015 | Nakatsu et al. |

FOREIGN PATENT DOCUMENTS

| | | |
|---|---|---|
| CN | 101473389 A | 7/2009 |
| CN | 101496261 A | 7/2009 |
| DE | 202005001931 U1 | 4/2005 |
| DE | 102010043595 A1 | 5/2012 |
| FR | 2622064 A1 | 4/1989 |
| GB | 740572 A | 11/1955 |
| JP | 55149430 A | 11/1980 |
| JP | 60210817 A | 10/1985 |
| JP | 0350807 A | 3/1991 |
| JP | 05217748 A | 8/1993 |
| JP | 2003007547 A | 1/2003 |
| JP | 2008218732 A | 9/2008 |
| JP | 2008218732 A * | 9/2008 |
| JP | 2011062061 A | 3/2011 |
| JP | 2011122711 A | 6/2011 |
| JP | 20129565 A | 1/2012 |
| JP | 2012009565 A * | 1/2012 |
| JP | 2012169466 A | 9/2012 |
| WO | 2011132361 A1 | 10/2011 |
| WO | 2012107826 A1 | 8/2012 |
| WO | 2012153619 A1 | 11/2012 |
| WO | 2013001591 A1 | 1/2013 |

OTHER PUBLICATIONS

James, et al., DC-DC Converter for Hybrid and All Electric Vehicles, EVS24 International Battery, Hybrid and Fuel Cell Electric Vehicle Symposium, Stavanger, Norway (2009) pp. 1-9.

März et al., Power Electronics System Integration for Electric and Hybrid Vehicles, Fraunhofer Institute of Integrated Systems and Device Technology, Erlangen, Germany, pp. 1-10.

\* cited by examiner

TEMPERATURE REGULATION OF AN INDUCTOR ASSEMBLY

CROSS-REFERENCE TO RELATED APPLICATIONS

This application is a division of U.S. application Ser. No. 15/367,800, filed Dec. 2, 2016, which is a continuation of U.S. application Ser. No. 13/673,731, filed Nov. 9, 2012, now U.S. Pat. No. 9,543,069, which issued Jan. 10, 2017, the disclosures of which are hereby incorporated in their entirety by reference herein.

TECHNICAL FIELD

One or more embodiments relate to an inductor assembly of a DC-DC converter that is mounted inside of a transmission housing.

BACKGROUND

The term "electric vehicle" as used herein, includes vehicles having an electric machine for vehicle propulsion, such as battery electric vehicles (BEV), hybrid electric vehicles (HEV), and plug-in hybrid electric vehicles (PHEV). A BEV includes an electric machine, wherein the energy source for the electric machine is a battery that is re-chargeable from an external electric grid. In a BEV, the battery is the source of energy for vehicle propulsion. A HEV includes an internal combustion engine and one or more electric machines, wherein the energy source for the engine is fuel and the energy source for the electric machine is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level, at which time the PHEV operates like a HEV for vehicle propulsion.

Electric vehicles may include a voltage converter (DC-DC converter) connected between the battery and the electric machine. Electric vehicles that have AC electric machines also include an inverter connected between the DC-DC converter and each electric machine. A voltage converter increases ("boosts") or decreases ("bucks") the voltage potential to facilitate torque capability optimization. The DC-DC converter includes an inductor (or reactor) assembly, switches and diodes. A typical inductor assembly includes a conductive coil that is wound around a magnetic core. The inductor assembly generates heat as current flows through the coil. An existing method for cooling the DC-DC converter by circulating fluid through a conduit that is proximate to the inductor is disclosed in U.S. 2004/0045749 to Jaura et al.

SUMMARY

In one embodiment, a vehicle is provided with a transmission having an inductor assembly and at least one gear that is configured to, when rotating, transmit torque between an input and output of the transmission and splash fluid onto the inductor assembly to cool the inductor assembly.

In another embodiment, a transmission is provided with a housing and a cylindrical inductor assembly that is disposed within the housing. The cylindrical inductor assembly includes a coil having exposed exterior surface area portions and a core formed onto the coil such that at least a portion of the exterior surface area portions is exposed to fluid within the transmission to cool the coil.

In yet another embodiment, a transmission is provided with a housing and a planar inductor assembly. The planar inductor assembly includes an insulative bobbin, a coil wound around the bobbin and having exposed surface area portions, and a core supported by the bobbin. The planar inductor assembly is disposed within the housing such that at least a portion of the exposed surface area portions is exposed to fluid within the housing to cool the coil.

In still yet another embodiment, a transmission is provided with a housing and an inductor assembly disposed within the housing. The transmission also includes at least one element that is adapted to, when rotating, transmit torque between an input and output of the transmission and displace cooling fluid onto the inductor assembly.

As such, the inductor assembly provides advantages over existing inductor assemblies by facilitating direct cooling of the conductor and core using transmission fluid. The inductor assembly is mounted within the transmission chamber such that it is directly cooled by transmission fluid through spraying, splashing and/or immersion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
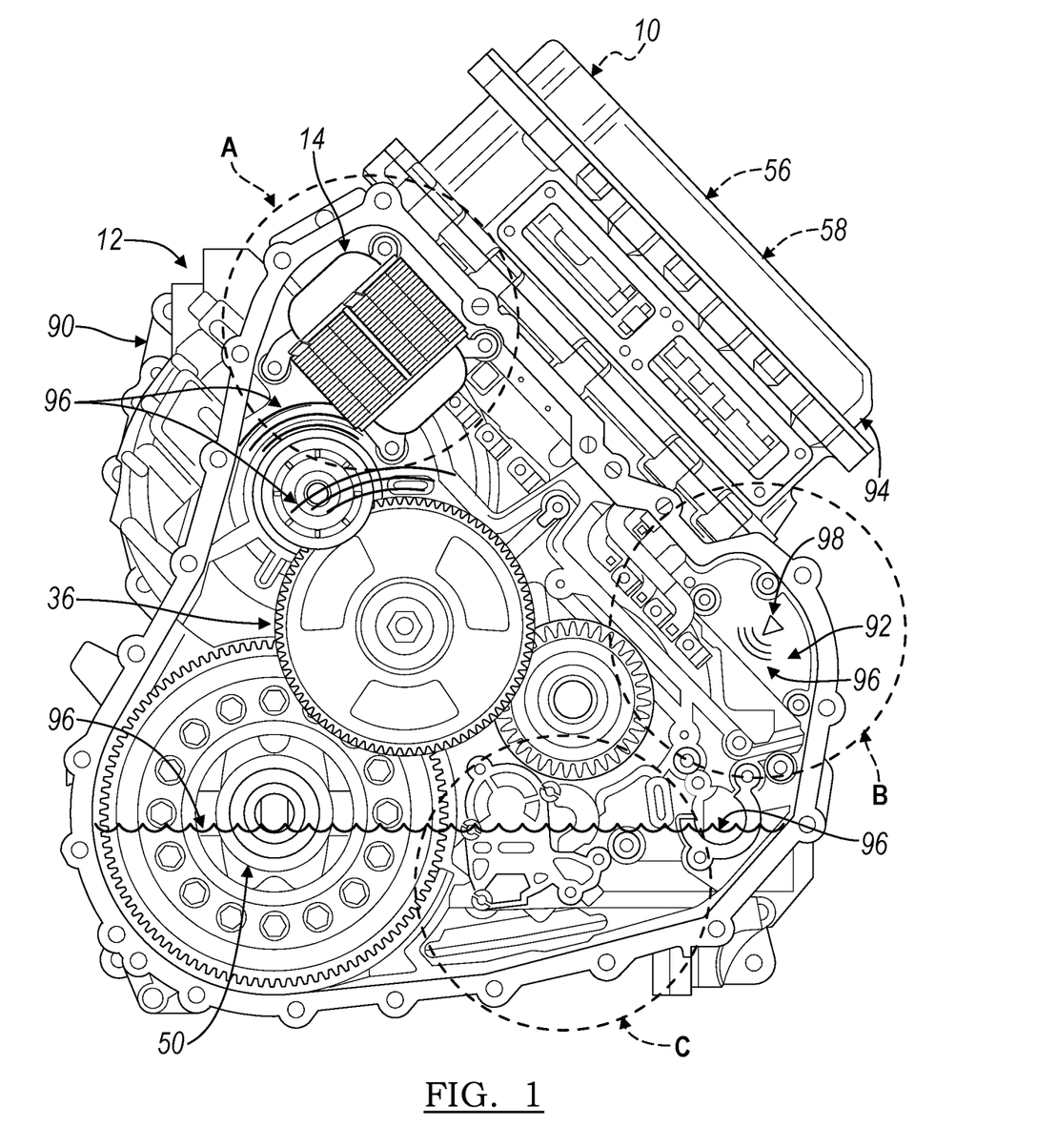
FIG. 1 is a front view of a transmission and a variable voltage converter (VVC) having an inductor assembly, and illustrating three different regions for mounting the inductor assembly within the transmission according to one or more embodiments.

With reference to FIG. 1, a DC-DC converter is illustrated in accordance with one or more embodiments and is generally referenced by numeral 10. The DC-DC converter 10 may also be referred to as a variable voltage converter (VVC) 10. The VVC 10 is an assembly with components that are mounted both inside and outside of a transmission 12. The VVC 10 includes an inductor assembly 14 that is mounted inside of the transmission 12 and a number of switches and diodes (shown in FIG. 3) that are mounted outside of the transmission 12. By mounting the inductor assembly 14 within the transmission 12, the inductor assembly 14 may be directly cooled by transmission fluid which allows for improved thermal performance.

Figure 2:
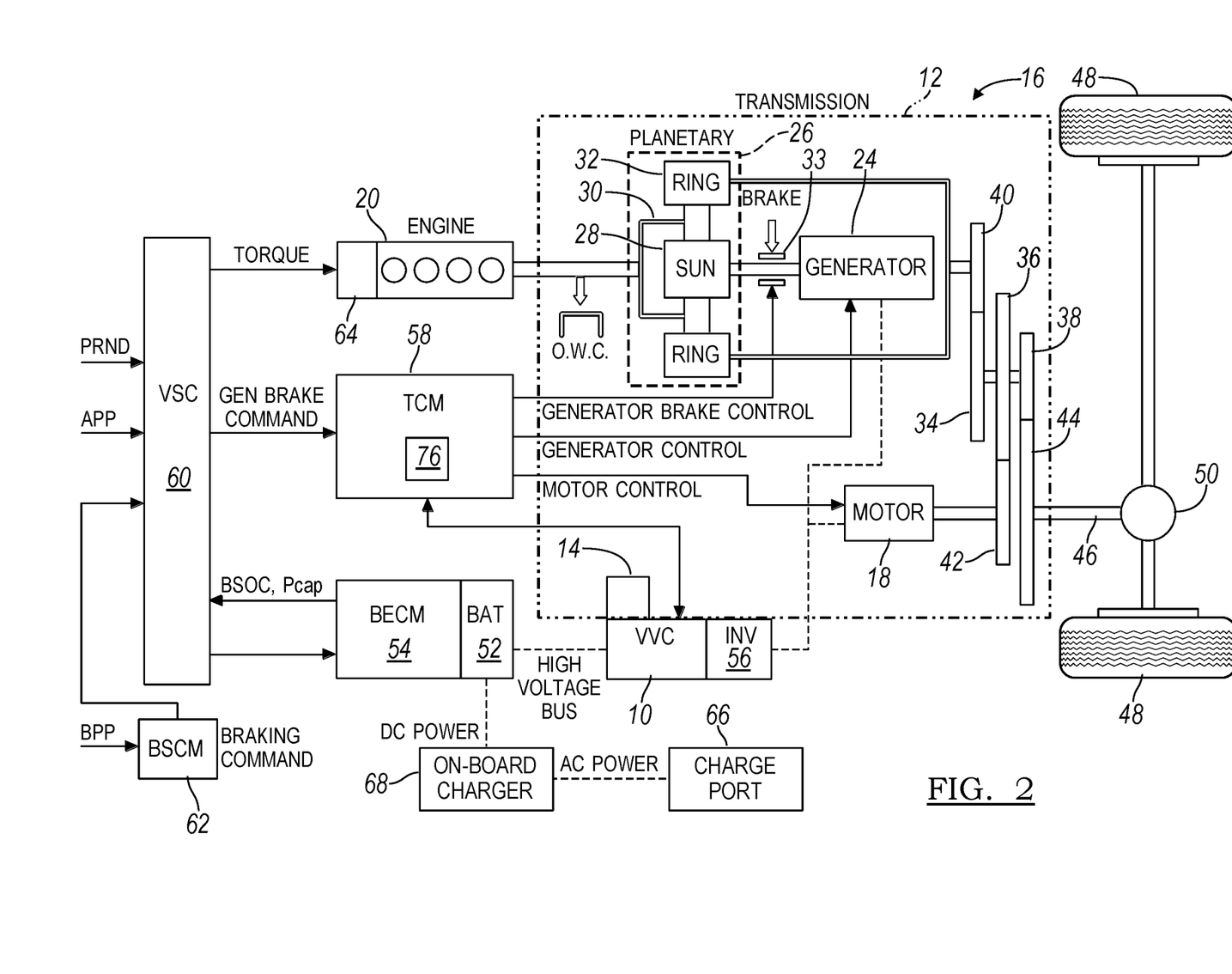
FIG. 2 is a schematic diagram of a vehicle including the transmission and the VVC of FIG. 1.

Referring to FIG. 2, the transmission 12 is depicted within a plug-in hybrid electric vehicle (PHEV) 16, which is an electric vehicle propelled by an electric machine 18 with assistance from an internal combustion engine 20 and connectable to an external power grid. The electric machine 18 is an AC electric motor according to one or more embodiments, and depicted as the "motor" 18 in FIG. 1. The electric machine 18 receives electrical power and provides drive torque for vehicle propulsion. The electric machine 18 also functions as a generator for converting mechanical power into electrical power through regenerative braking.

The transmission 12 has a power-split configuration, according to one or more embodiments. The transmission 12 includes the first electric machine 18 and a second electric machine 24. The second electric machine 24 is an AC electric motor according to one or more embodiments, and depicted as the "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12.

The transmission 12 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 also includes a one-way clutch (O.W.C.) and a generator brake 33, according to one or more embodiments. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. In other embodiments, the O.W.C. and the generator brake 33 are eliminated, and replaced by control strategies for the engine 20 and the second electric machine 24.

The transmission 12 includes a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a battery 52 for storing electrical energy. The battery 52 is a high voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of the BSOC and the battery power capability to other vehicle systems and controllers.

The transmission 12 includes the VVC 10 and an inverter 56. The VVC 10 and the inverter 56 are electrically connected between the main battery 52 and the first electric machine 18; and between the battery 52 and the second electric machine 24. The VVC 10 "boosts" or increases the voltage potential of the electrical power provided by the battery 52. The VVC 10 also "bucks" or decreases the voltage potential of the electrical power provided by the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the main battery 52. Other embodiments of the transmission 12 include multiple inverters (not shown), such as one invertor associated with each electric machine 18, 24.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes a braking system (not shown) which includes a brake pedal, a booster, a master cylinder, as well as mechanical connections to the driven wheels 48, to effect friction braking. The braking system also includes position sensors, pressure sensors, or some combination thereof for providing information such as brake pedal position (BPP) that corresponds to a driver request for brake torque. The braking system also includes a brake system control module (BSCM) 62 that communicates with the VSC 60 to coordinate regenerative braking and friction braking. The BSCM 62 provides a regenerative braking command to the VSC 60, according to one embodiment.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

The vehicle 16 is configured as a plug-in hybrid electric vehicle (PHEV) according to one or more embodiments. The battery 52 periodically receives AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging.

Although illustrated and described in the context of a PHEV 16, it is understood that embodiments of the VVC 10 may be implemented on other types of electric vehicles, such as a HEV or a BEV.

Figure 3:
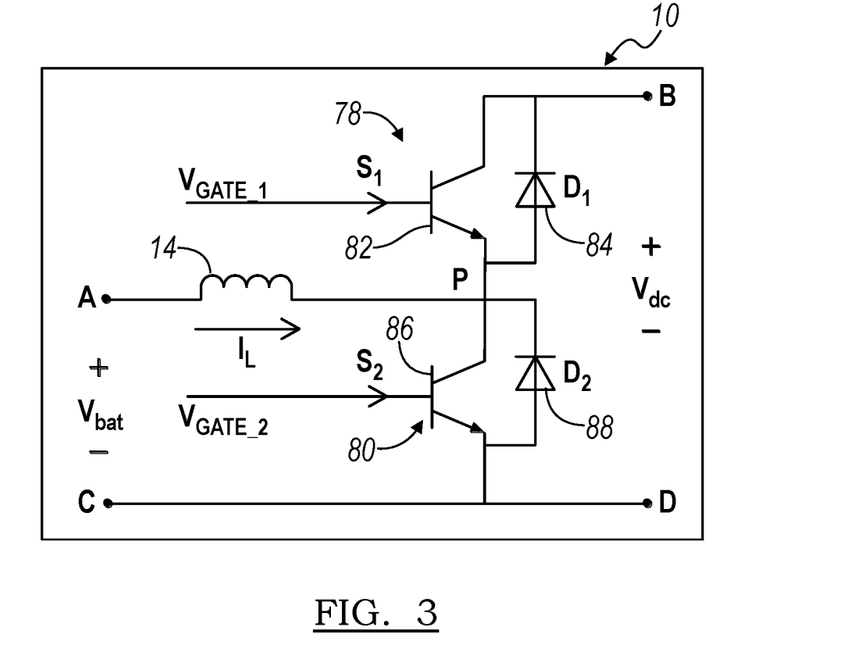
FIG. 3 is a circuit diagram of the VVC of FIG. 1.

With reference to FIG. 3, the VVC 10 includes a first switching unit 78 and a second switching unit 80 for boosting the input voltage ($V_{bat}$) to provide output voltage ($V_{dc}$). The first switching unit 78 includes a first transistor 82 connected in parallel to a first diode 84, but with their polarities switched (anti-parallel). The second switching unit 80 includes a second transistor 86 connected anti-parallel to a second diode 88. Each transistor 82, 86 may be any type of controllable switch (e.g., an insulated gate bipolar transistor (IGBT) or field-effect transistor (FET)). Additionally, each transistor 82, 86 is individually controlled by the TCM 58. The inductor assembly 14 is depicted as an input inductor that is connected in series between the main battery 52 and the switching units 78, 80. The inductor 14 generates magnetic flux when a current is supplied. When the current flowing through the inductor 14 changes, a time-varying magnetic field is created, and a voltage is induced. Other embodiments of the VVC 10 include different circuit configurations (e.g., more than two switches).

Referring back to FIG. 1, the transmission 12 includes a transmission housing 90, which is illustrated without a cover to show internal components. As described above, the engine 20, the motor 18 and the generator 24 include output gears that mesh with corresponding gears of the planetary gear unit 26. These mechanical connections occur within an internal chamber 92 of the transmission housing 90. A power electronics housing 94 is mounted to an external surface of the transmission 12. The inverter 56 and the TCM 58 are mounted within the power electronics housing 94. The VVC 10 includes components (e.g., the switches 78, 80 and diodes 84, 88 shown in FIG. 3) that are mounted within the power electronics housing 94 and the inductor assembly 14 which is mounted within the chamber 92 of the transmission housing 90.

The transmission 12 includes fluid 96 such as oil, for lubricating and cooling the gears located within the transmission chamber 92 (e.g., the intermediate gears 34, 36, 38). The transmission chamber 92 is sealed to retain the fluid 96. The transmission 12 also includes pumps and conduits (not shown) for circulating the fluid 96 through the chamber 92.

Rotating elements (e.g., intermediate gear 36 and shaft 39, shown in FIG. 6) may displace or "splash" fluid 96 on other components. Such a "splash" region is referenced by letter "A" in FIG. 1 and is located in an upper portion of the chamber 92. In region A, the inductor assembly 14 is cooled by transmission fluid 96 that splashes off of the rotating elements (e.g., the second intermediate gear 36, the shaft 39 (shown in FIG. 6) and the differential 50) as they rotate.

Figure 10:
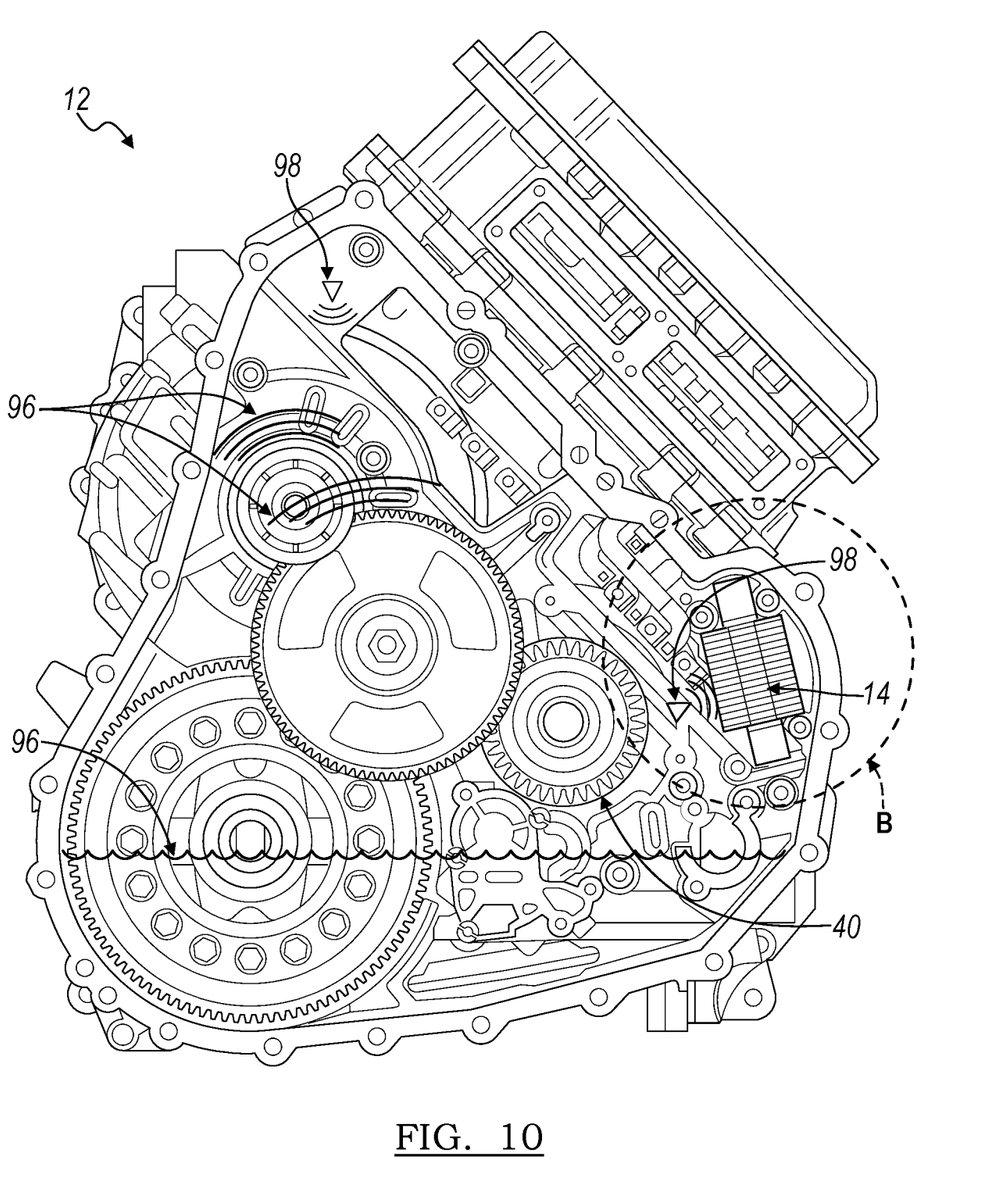
FIG. 10 is another front view of the transmission illustrating the inductor assembly of FIG. 1 mounted within an intermediate region, according to one or more embodiments.

The transmission 12 includes nozzles 98 for directly spraying the transmission fluid 96 on components within the housing 90, according to one or more embodiments. Such a "spray" region is referenced by letter "B" in FIG. 1 and is located in an intermediate portion of the chamber 92. The inductor assembly 14 may be mounted within region B (as shown in FIG. 10) and cooled by transmission fluid 96 that sprays from the nozzle 98. The inductor assembly 14 may also receive transmission fluid 96 that splashes off of proximate rotating elements (e.g., the planetary gear unit 26). Other embodiments of the transmission 12 contemplate multiple nozzles (nozzles) one or more nozzles that are mounted in other locations of the chamber 92 (e.g., a nozzle mounted in region A).

Figure 11:
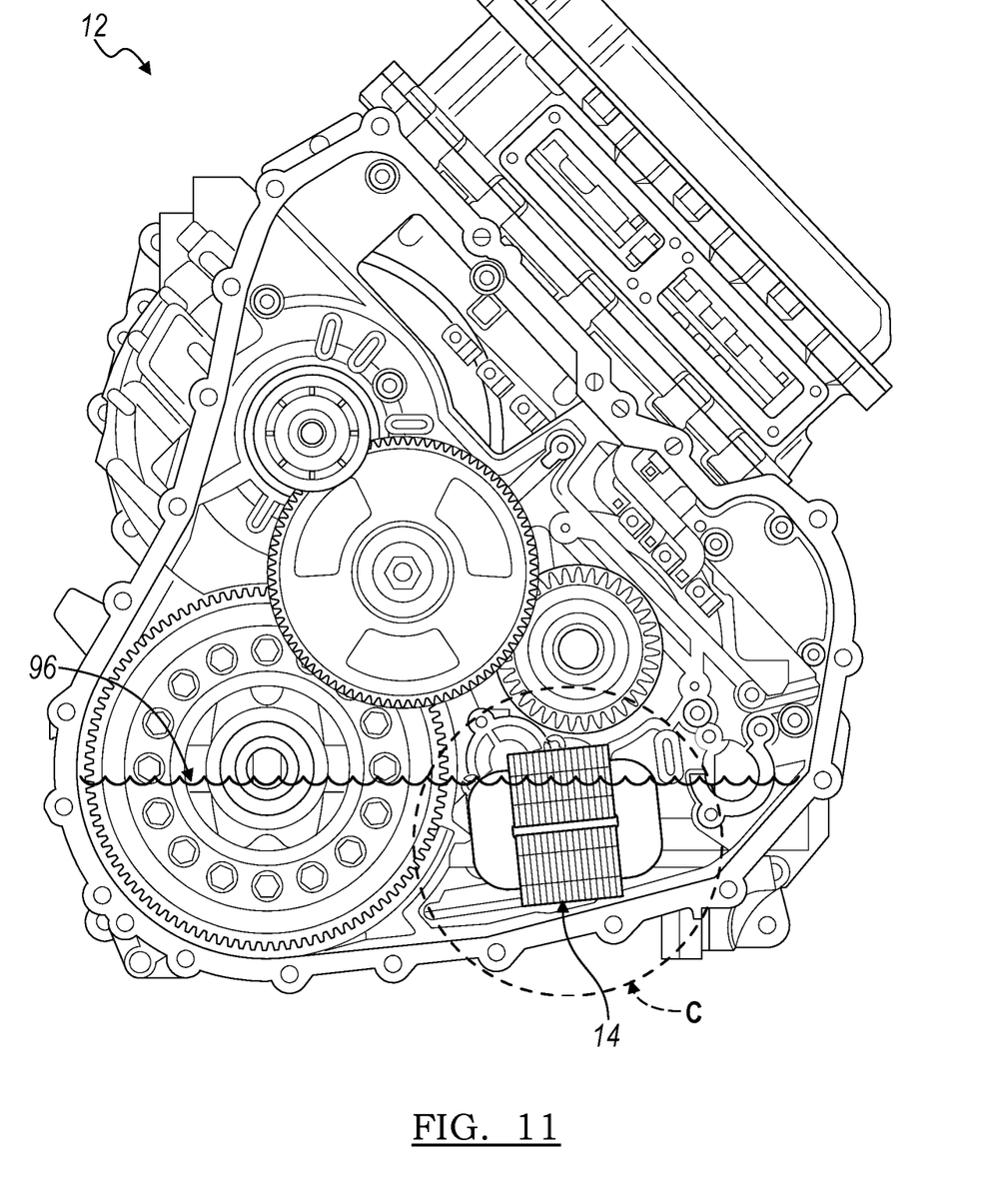
FIG. 11 is yet another front view of the transmission illustrating the inductor assembly of FIG. 1 mounted within a lower region, according to one or more embodiments.

Further, the transmission fluid 96 accumulates within a lower portion of the chamber 92. Such an "immersion" region is referenced by letter "C" in FIG. 1 and is located in a lower portion of the chamber 92. The inductor assembly 14 may be mounted within region C (as shown in FIG. 11) and immersed in the transmission fluid 96.

Figure 4:
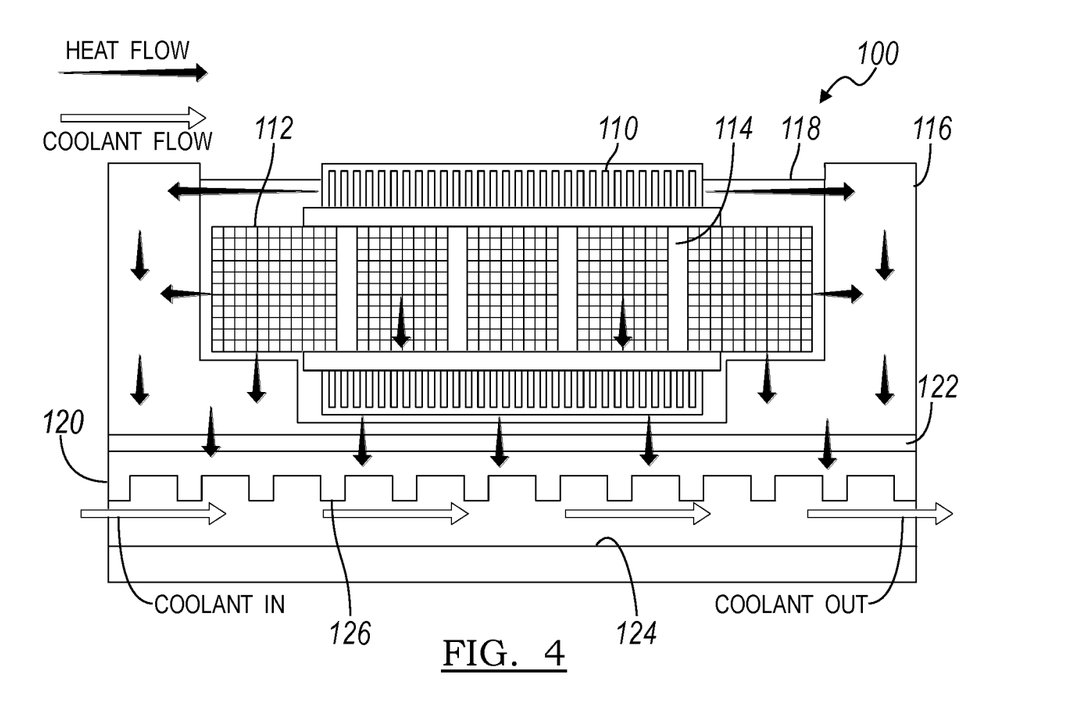
FIG. 4 is a section view of an inductor assembly according to another embodiment.

FIG. 4 illustrates an inductor assembly 100 that is configured for indirect cooling according to an existing method. Such an inductor assembly 100 is mounted external of the transmission housing 90 (e.g., within the power electronics housing 94 of FIG. 1). The inductor assembly 100 includes a conductor 110 that is wrapped around a magnetic core 112. The magnetic core 112 includes a plurality of core elements that are spaced apart to define air gaps 114. Ceramic spacers may be placed between the core elements to maintain the air gaps 114. The inductor assembly 100 is encased inside an inductor housing 116 (e.g., an Aluminum housing) and empty space around the inductor assembly 100 is filled with a thermally conductive, electrically insulating adhesive material, such as a potting compound 118. The inductor housing 116 is clamped to a cold plate 120 and thermal grease 122 is applied between the inductor housing 116 and the cold plate 120. A passage 124 is formed through the cold plate 120. Cold fluid or coolant (e.g., 50% water and 50% ethylene glycol) flows through the passage 124. Heat transfers by conduction from the conductor 110 and the core 112 to the potting compound 118 and then to housing 116, thermal grease 122 and finally into the cold plate 120. Heat from the cold plate 120 transfers into the coolant flowing through the passage 124 by convection. Additionally the cold plate 120 may include fins 126 for transferring heat into surrounding air by convection.

The thermal resistance of the heat transfer path from the conductor 110 to the coolant flowing through the passage 124 of the cold plate 120 is high. The thermal grease 122, the potting compound 118 and the cold plate 120 contribute significantly to this resistance. As a result, the thermal performance of this potted inductor assembly 100 is limited and the temperature of the inductor assembly 100 at various locations increases and may exceed predetermined temperature limits at high electrical power loads. In one or more embodiments, a controller (e.g., the TCM of FIG. 1) may limit the performance of the inductor assembly 100 if temperatures of the inductor assembly 100 exceed such predetermined limits.

The temperature of the inductor assembly 100 depends on the amount of current flowing through the conductor 110 and the voltage potential across the conductor 110. Recent trends in electric vehicles include higher current capability of the inductor. For example, increased battery power for the extended electric range in PHEVs and reduced battery cells for the same power in HEVs result in increased inductor current rating in electric vehicles. Additionally, reduced battery voltage also leads to an increase in the inductor ac losses due to a higher magnitude of high frequency ripple current. Therefore, due to additional heat generation, the temperature of the inductor assembly 100 will generally increase and if heat is not dissipated, the inductor temperature may exceed predetermined limits. One solution is to increase the cross-sectional area of the conductor coil to reduce inductor loss and also improve heat dissipation (due to more surface area). However, such changes will increase the overall size of the inductor assembly. A larger inductor assembly may be difficult to package in all vehicle applications, and larger components affect vehicle fuel economy and cost.

Rather than increase the size of the inductor assembly 100, to improve the inductor thermal performance and thermal capacity, the inductor assembly 100 may be mounted within the transmission chamber 92 and directly cooled using transmission fluid 96 as described with reference to FIG. 1. The transmission fluid 96 is an electrical insulator which can be used in direct contact with electrical components (e.g., the conductor 110 and the core 112). However, excess components associated with the inductor assembly 100 may be removed if the assembly 100 is subjected to such direct cooling. For example, the potting compound 118 and the aluminum housing 116 may be removed. However, the potting compound 118 and the housing 116 support the conductor 110 and the core 112. Additionally, vibration is more severe inside of the transmission 12, than outside. Therefore the overall structure of the inductor assembly 100 is revised in order to remove the potting compound 118 and housing 116 and mount the assembly inside of the transmission 12.

Figure 5:
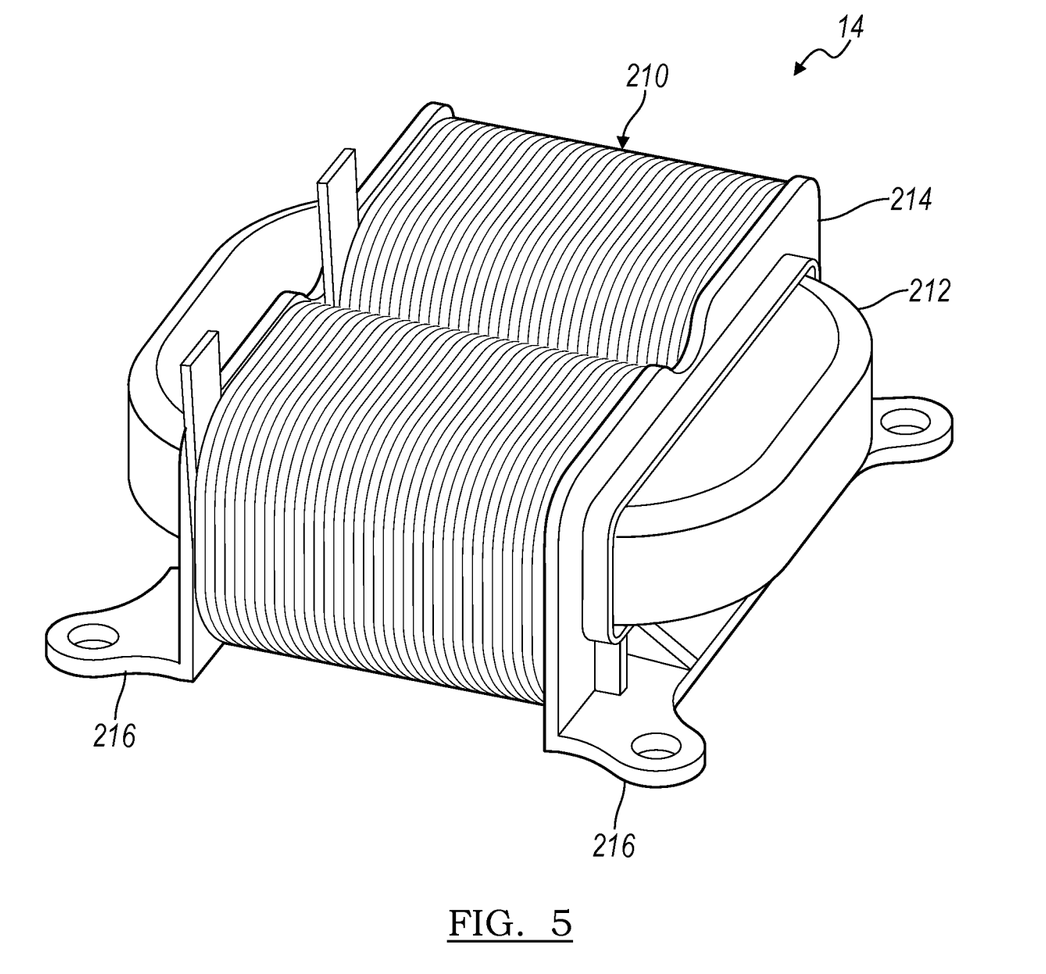
FIG. 5 is an enlarged front perspective view of the inductor assembly of FIG. 1.

FIG. 5 illustrates an inductor assembly 14 that is configured to be mounted within the transmission 12, according to one or more embodiments. The inductor assembly 14 provides a simplified version of the inductor assembly 100 described with reference to FIG. 4, in that the excess components (e.g., the potting compound, the aluminum housing, the cold plate and the thermal grease) have been removed. The inductor assembly 14 includes a conductor 210 that is formed into two adjacent tubular coils, a core 212 and an insulator 214. The core 212 has a generally planar shape with a dual "C" configuration, according to the illustrated embodiment. The insulator 214 physically separates the conductor 210 from the core 212 and is formed of an electrically insulating polymeric material, such as Polyphenylene sulfide (PPS).

Figure 13:
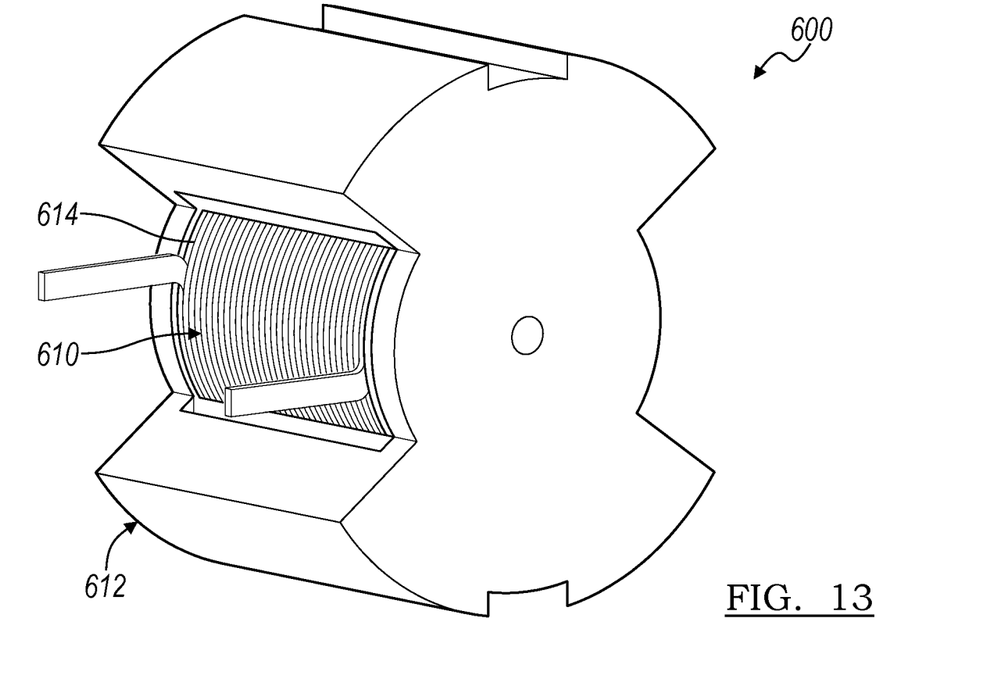
FIG. 13 is a front perspective view of an inductor assembly according to another embodiment.

The conductor 210 is formed of a conductive material, such as copper or aluminum, and wound into two adjacent helical coils. The coils are formed using a rectangular (or flat) type conductive wire by an edgewise process, according to one or more embodiments. An input and output lead extend from the conductor 210 and connect to components that are mounted external to the transmission 12 (e.g., the battery 52 and the switches 78, 80 as shown in FIGS. 2 and 3). The core 212 is formed of a magnetic material, such as an iron silicon alloy powder. The core 212 may be formed as a unitary (one-piece) structure (as shown in FIG. 13), or as a plurality of segments (not shown) to form air gaps within each coil. The insulator 214 may be formed as a bobbin structure, where the conductor 210 is wound about the bobbin. The insulator 214 includes flanges 216 having apertures for receiving fasteners (not shown) for mounting the inductor assembly 14, according to one or more embodiments. Other embodiments of the inductor assembly 14 contemplate an insulator that is separate from the bracket, which may be formed of a polymer, paper (e.g., Nomex® Paper), or a coating applied to the conductor (not shown).

Figure 6:
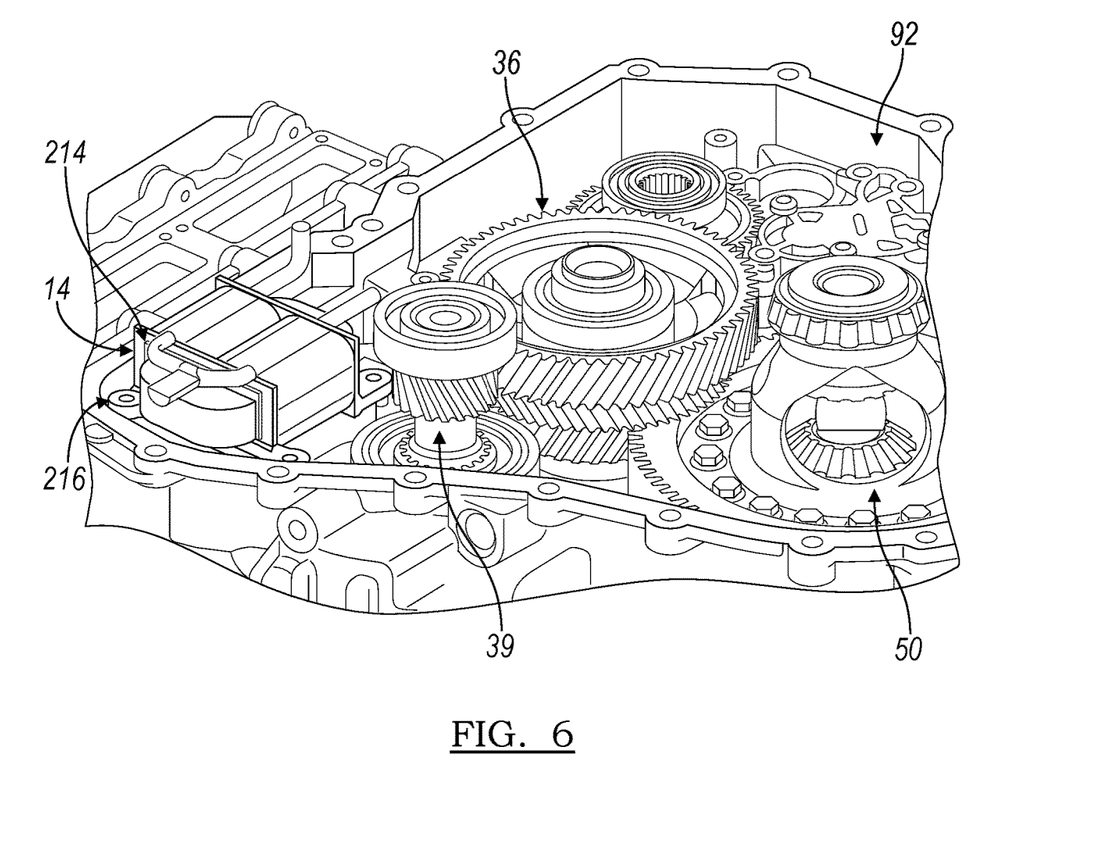
FIG. 6 is an enlarged side perspective view of a portion of FIG. 1 illustrating the inductor assembly mounted in an upper region.

Referring to FIG. 6, the inductor assembly 14 may be mounted within the transmission chamber 94. The inductor assembly 14 is mounted within an upper portion of the transmission chamber 92 in the illustrated embodiment, such that it is directly cooled by the transmission fluid 96 that splashes off of gears (e.g., the second intermediate gear 36 and the differential 50). The inductor assembly 14 generates heat as current flows through the conductor 210. Heat transfers by convection from the conductor 210 and core 212 to the fluid 96, as the fluid 96 flows over the inductor assembly 14.

Figure 7:
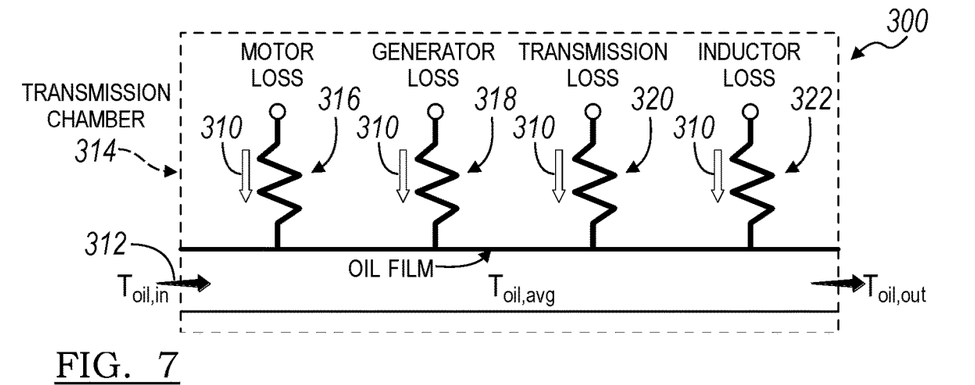
FIG. 7 is a diagram illustrating a thermal resistance network for cooling the inductor assembly of FIG. 5.

FIG. 7 illustrates a thermal resistance network 300 and a direction of heat flow for the inductor assembly 14 shown in FIG. 6. A direction of heat transfer (or heat flow) is represented by arrows and numeral 310. The transmission fluid 312 enters the transmission chamber 314 at an inlet temperature that is represented by variable ($T_{oil\_in}$). Transmission elements that dissipate heat due to power losses are represented by resistors in FIG. 7, including the motor resistance 316, the generator resistance 318, the transmission housing resistance 320, and the inductor assembly resistance 322. The fluid 312 is displaced over these elements, and heat transfers into the fluid 312.

In case of the inductor, the heat is generated in the conductor and core (shown in FIG. 6). Since the conductor and core of the inductor assembly 14 are directly exposed to the fluid, rather than being coated in a potting compound as shown in the inductor assembly 100 of FIG. 4, heat is effectively dissipated from the inductor assembly 14 without any thermal barrier. The heat loads 316-322 heat the fluid 312 and as a result, the fluid 312 leaves the transmission chamber 314 at a higher temperature ($T_{oil\_out} >> T_{oil\_in}$).

For mathematical simplicity, the bulk average temperature of the inlet and outlet fluid 312 may be used to analyze the thermal performance. Therefore the thermal resistance ($\theta_{inductor}$) for splash cooling performance of the inductor is calculated according to equations 1 and 2 as shown below:

$$T_{oil\_avg} = \frac{T_{oil\_in} + T_{oil\_out}}{2} \quad (1)$$

$$\theta_{inductor} = \frac{T_{inductor\_max} - T_{oil\_avg}}{Q_{inductor}} \quad (2)$$

where $Q_{inductor}$ is the heat loss in Watts.

Directly cooling the inductor assembly 14 using transmission fluid improves the cooling capacity of the inductor by making the system more energy efficient (more fuel-efficient) and allows for a smaller and lighter inductor structure, which results in lower inductor cost. The new technique of splash ATF cooling of the inductor inside transmission housing offers a significant improvement in inductor (steady state) thermal capability and transient thermal performance.

Figure 8:
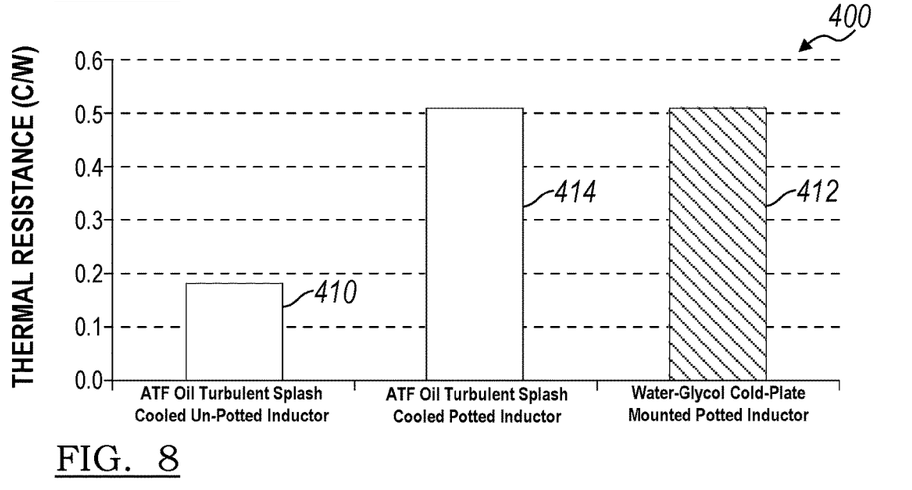
FIG. 8 is a graph illustrating a comparison of the steady-state thermal resistance of the inductor assemblies of FIG. 4 and FIG. 5.

FIG. 8 is a graph illustrating a comparison of the steady-state thermal resistance of the inductor assemblies of FIGS. 4 and 5, and is represented by numeral 400. Bar 410 represents the thermal resistance Centigrade/Watts (C/W). Of an inductor assembly having a structure that does not include a potting compound (e.g., the inductor assembly 14) and is mounted within a transmission chamber and directly cooled by transmission fluid (as shown in FIG. 6). Bar 412 represents the thermal resistance (C/W) of an inductor assembly having a structure that includes a potting compound (e.g., the inductor assembly 100) and is mounted external to a transmission and is indirectly cooled by coolant that flows through a cold plate (as shown in FIG. 4). Bar 414 represents the thermal resistance (C/W) of the potted inductor assembly 100 when mounted within a transmission chamber and directly cooled by transmission fluid (not shown).

With a potted inductor (e.g., inductor assembly 100), the thermal resistance 412, 414 is approximately the same with both cooling methods, resulting in the same steady state thermal performance but better transient thermal performance (not shown). However, the impact of directly cooling the inductor using transmission fluid is pronounced when an un-potted inductor (e.g., inductor assembly 14) is used. The difference between the thermal resistance for un-potted inductor that is directly cooled 410 (0.18 C/W) and a potted inductor that is both directly and indirectly cooled 414 (0.51 C/W) is approximately 65%.

Figure 9:
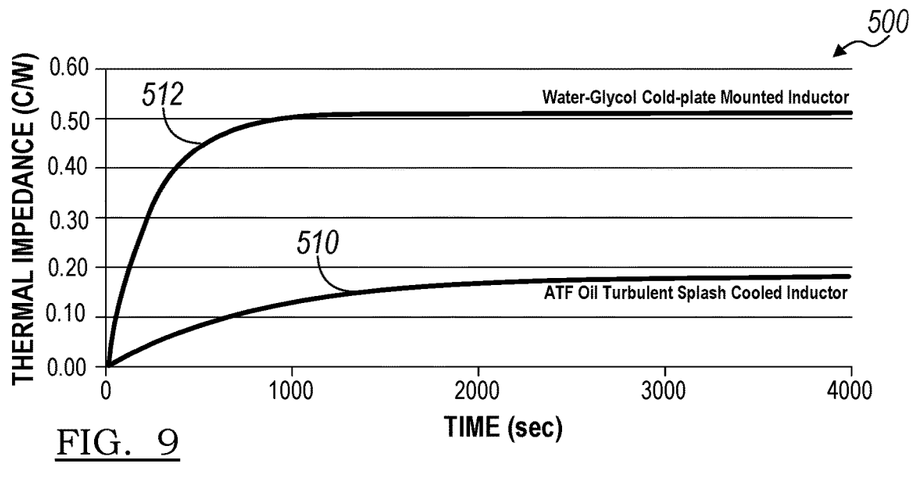
FIG. 9 is a graph illustrating a comparison of the thermal impedance of the inductor assemblies of FIG. 4 and FIG. 5.

With reference to FIG. 9, during operation of a PHEV in electric vehicle (EV) mode, it is common for an inductor assembly to experience high current transients and heat load transients. Vehicle thermal management systems utilize high time constants to control inductor temperature so that it does not exceed predetermined temperature limits. FIG. 9 is a graph illustrating a comparison of the thermal impedance of a potted indirectly cooled inductor assembly and an un-potted directly cooled inductor assembly, and is represented by numeral 500. Such thermal impedance values over time correspond to the transient performance of the inductor assembly. The thermal impedance of an un-potted directly cooled inductor assembly (e.g., inductor assembly 14 of FIG. 6) is represented by numeral 510. The thermal impedance of a potted indirectly cooled inductor assembly (e.g., inductor assembly 100 of FIG. 4) is represented by numeral 512. As illustrated in the graph 500, the time constant of curve 510 is approximately one third of curve 512. Additionally, the thermal mass of transmission casing and other elements present inside of the transmission chamber contribute to the effective thermal mass of the inductor, which slows down the warming of the conductor coil. Thus, the steady-state and transient thermal performance is significantly improved with direct cooling of an un-potted inductor where the coils and cores are fully exposed to the transmission fluid (as shown in FIG. 6).

FIG. 10 illustrates spray cooling of the inductor assembly 14 according to one or more embodiment. The transmission 12 includes nozzles 98 for directly spraying the transmission fluid 96 on components within the housing 90, according to one or more embodiments. Such a "spray" region is referenced by letter B and is located in an intermediate portion of the chamber 92.

The inductor assembly 14 may be mounted in a different orientation in region B, as compared to that of region A, based on packaging constraints and the flow of transmission fluid 96. For example, the inductor assembly 14 illustrated in FIG. 10 is mounted transversely as compared to the planar mounting configuration shown in FIG. 6. The inductor assembly 14 may also receive transmission fluid 96 that splashes off of proximate rotating components (e.g., the planetary output gear 40) in region B. Other embodiments of the transmission 12 contemplate multiple nozzles in region B, or additional nozzles that are mounted in other locations of the chamber 92 (e.g., the nozzle 98 illustrated in phantom line and shown in region A).

FIG. 11 illustrates cooling of the inductor assembly 14 by immersion. The transmission fluid 96 accumulates within a lower portion of the chamber 92. Such an "immersion" region is referenced by letter C. The inductor assembly 14 is mounted in a planar configuration within region C and immersed in the transmission fluid 96 in the illustrated embodiment.

Figure 12:
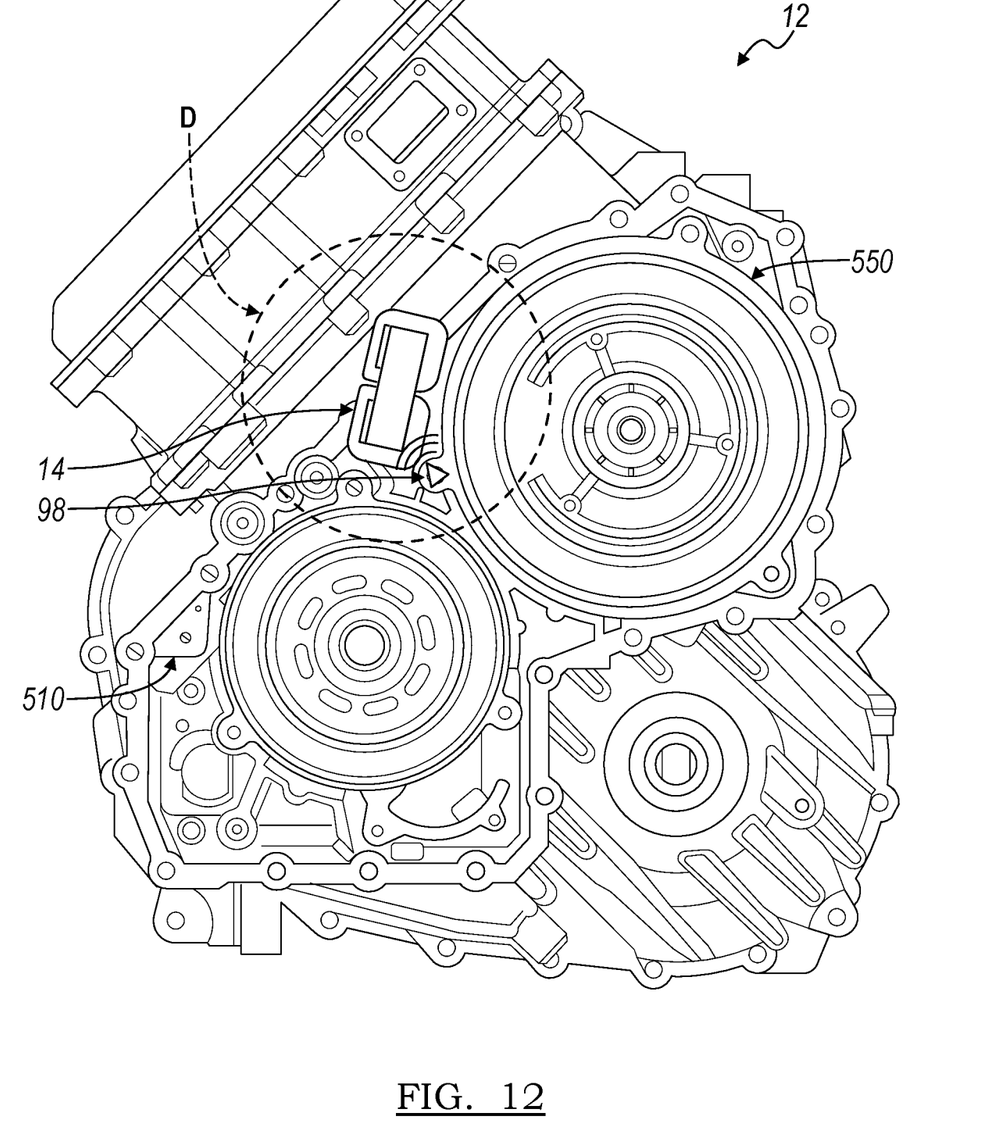
FIG. 12 is a rear view of the transmission illustrating the inductor assembly of FIG. 1 mounted within an upper region, according to one or more embodiments.

With reference to FIG. 12, the inductor assembly 14 is mounted within a rear chamber 550 of the transmission housing 90, according to one or more embodiments. The transmission 12 includes one or more passages 510 that connect the rear chamber 550 to the front chamber for enabling the flow of the fluid 96 between the chambers. Like the front chamber of the transmission 12 (shown in FIGS. 1, 6, and 10-12) the rear chamber 550 includes transmission fluid 96 for cooling and lubricating rotating components. Such rotating components displace or splash the transmission fluid 96 onto proximately mounted components. Additionally, the transmission 12 may include one or more nozzles 98 within the rear chamber 550 for spraying transmission fluid 96 on components. Such a "splash/spray" region is referenced by letter "D".

Referring to FIG. 13, an integrated inductor assembly having a cylindrical core is illustrated in accordance with one or more embodiments and is generally referenced by numeral 600. The integrated inductor assembly 600 includes a conductor 610 that is formed into a coil, a unitary (one-piece) core 612 and an insulator 614 that are integrally formed with each other. Similar to the planar inductor assembly 14 of FIG. 5, the integrated inductor assembly 600 is an un-potted design that is configured to be mounted within regions A, B, or C of the transmission chamber 92 (FIG. 1) or within region D of the rear chamber 550 (FIG. 12).

Figure 14:
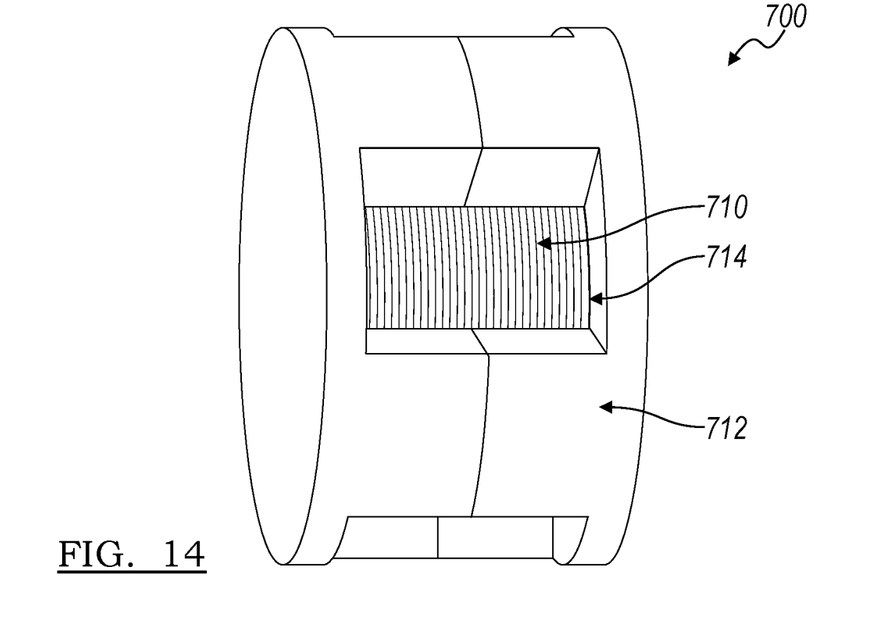
FIG. 14 is a front perspective view of an inductor assembly according to yet another embodiment.

With reference to FIG. 14, a cylindrical inductor assembly having a cylindrical core is illustrated in accordance with one or more embodiments and is generally referenced by numeral 700. The cylindrical inductor assembly 700 includes a conductor 710 that is formed into a coil, a two piece core 712 and an insulator 714 that physically separates the conductor 710 from the core 712. Similar to the planar inductor assembly 14 of FIG. 5, and the integrated inductor assembly 600 of FIG. 13, the cylindrical inductor assembly 700 is an un-potted design that is configured to be mounted within regions A, B, or C of the transmission chamber 92 (FIG. 1) or within region D of the rear chamber 550 (FIG. 12).

As such, the inductor assembly 14, 600, 700 provides advantages over existing inductor assemblies 100 by facilitating direct cooling of the conductor and core. Such direct cooling may be used for cooling existing inductor assembly 100 designs or simplified (un-potted) inductor assembly 14, 600, 700 designs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a transmission defining a chamber and including an inductor assembly and at least one gear mounted proximate to each other within the chamber, the at least one gear adapted to, when rotating, transmit torque between an input and output of the transmission and splash fluid directly onto the inductor assembly to cool the inductor assembly;
wherein the inductor assembly comprises an insulator, a coil wound around the insulator and having exposed surface area portions, and a core formed in a generally planar shape and supported by the insulator, and
wherein the inductor assembly is mounted within an intermediate region of the chamber between an upper region and a lower region, and the fluid accumulates in the lower region and wherein the vehicle further comprises a nozzle disposed in the intermediate region.

2. The vehicle of claim 1 wherein the inductor assembly further comprises at least one switch mounted external to the transmission and in electrical communication with the coil.

3. The vehicle of claim 1 wherein the core comprises a plurality of elements that are spaced apart from each other to define air gaps between adjacent elements.

4. The vehicle of claim 3 wherein the core further comprises an insulative spacer disposed between adjacent elements to maintain the air gap.

5. The vehicle of claim 1 wherein the insulator supports the coil and the core without an additional housing.

6. The vehicle of claim 1 wherein the insulator supports the coil and the core without insulative material disposed on an outer portion of the coil such that the coil is exposed to direct contact with fluid within the transmission to cool the coil.

7. The vehicle of claim 1 further comprising:
an engine coupled to the transmission;
an electric machine coupled to the transmission; and
a driveshaft extending from the transmission,
wherein the at least one gear further comprises intermediate gears adapted to transfer torque between at least one of the engine and the electric machine to the driveshaft.

8. A transmission comprising:
a housing defining a chamber;
a planar inductor assembly (i) including an insulative bobbin, a coil wound around the insulative bobbin and having exposed surface area portions, and a core supported by the insulative bobbin and (ii) disposed within the chamber of the housing such that at least a portion of the exposed surface area portions is exposed to fluid within the chamber to cool the coil, wherein the planar inductor assembly is mounted within an intermediate region of the chamber between an upper region and a lower region, and wherein the fluid accumulates in the lower region; and
at least one element rotatably mounted within the chamber and proximate to the planar inductor assembly, wherein the at least one element is in contact with the fluid and adapted to displace a portion of the fluid directly onto the planar inductor assembly during rotation.

9. The transmission of claim 8 further comprising a nozzle disposed in the upper region.

10. A transmission comprising:
a housing defining a chamber;
an inductor assembly disposed within the chamber of the housing; and
at least one element disposed within the chamber and proximate to the inductor assembly, wherein the at least one element is adapted to, when rotating, transmit torque between an input and output of the transmission and displace cooling fluid directly onto the inductor assembly, wherein the chamber comprises an upper region, a lower region, and an intermediate region between the upper region and lower region, wherein the inductor assembly is mounted within the intermediate region and the cooling fluid accumulates in the lower region.

11. The transmission of claim 10 wherein the inductor assembly further comprises:
a bobbin;
a coil wound around the bobbin and having exposed surface area portions; and
a core formed in a generally planar shape and supported by the bobbin.

12. The transmission of claim 11 further comprising at least one switch mounted external to the transmission to communicate electrically with the coil.

13. The transmission of claim 11 wherein the core comprises a plurality of elements with insulative spacers disposed between adjacent core elements to define air gaps.

14. The transmission of claim 11 wherein the core comprises a plurality of elements that are spaced apart from each other to define air gaps between adjacent elements.

15. The transmission of claim 14 wherein the core further comprises at least one insulative spacer disposed between adjacent elements to maintain the air gap.

16. The transmission of claim 11 wherein the bobbin supports the coil and the core without an additional housing.

17. The transmission of claim 11 wherein the bobbin supports the coil and the core without potting compound disposed on an outer portion of the coil.

18. The transmission of claim 10 further comprising a nozzle disposed in the intermediate region.

19. The transmission of claim 10 wherein the at least one element further comprises three intermediate gears and wherein the intermediate gears are coaxially aligned and adapted to transfer torque between at least one of an engine and an electric machine to a driveshaft.

20. The transmission of claim 10 wherein the at least one element further comprises a shaft.

\* \* \* \* \*